Dec. 12, 1967 J. E. YOUNG ET AL 3,358,081

FACSIMILE PRINTER WITH FERROELECTRIC MODULATOR

Filed Oct. 20, 1964 2 Sheets-Sheet 1

INVENTOR.
JAMES E. YOUNG
DAVID C. HARPER
BY Anthony W. Cennamo
Stanley Z. Cole
ATTORNEYS

FACSIMILE PRINTER WITH FERROELECTRIC MODULATOR

Filed Oct. 20, 1964 2 Sheets-Sheet 2

INVENTOR.
JAMES E. YOUNG
DAVID C. HARPER
BY
ATTORNEYS

United States Patent Office 3,358,081
Patented Dec. 12, 1967

3,358,081
FACSIMILE PRINTER WITH FERROELECTRIC MODULATOR

James E. Young, Pittsford, and David C. Harper, Rochester, N.Y., assignors to Xerox Corporation, Rochester, N.Y., a corporation of New York Filed Oct. 20, 1964, Ser. No. 405,126
7 Claims. (Cl. 178—6.6)

This invention relates to visual recording from electrical signals and particularly to visual recording from electrical signals by ferroelectric modulation of a light source.

The ease of transmitting and otherwise manipulating an electrical signal makes it frequently desirable today to convert information from a printed page or from media such as film into an electrical signal for further processing before printing out. In direct optical printing from an original, for example, it is difficult to perform any manipulations of the subject matter and the printout material will generally include undesired characteristics and/or portions of the original. But by electronic scanning techniques and by converting the image information to electrical signals, it becomes possible to eliminate waste paper in the final printout without starting and stopping the machinery. It also becomes possible to separate graphic materials from textual material and to readily rearrange the format of the material to be printed without entailing mechanical complexity. Relatively simple electronic circuitry can handle these various tasks. It is also frequently desirable to print out electrical signals originating from television cameras and various forms of electronic computers.

It has been a difficulty of most electronic scanning techniques that high speed and high resolution are both difficult to achieve. This is partly due to the fact that most electronic scanning systems use cathode ray flying spot scanners with their attendant limited light intensity and poorly resolved spots.

Now in accordance with the present invention, a high speed printer has been developed for recording from an electrical signal input. This is achieved by combining xerographic apparatus with a scanner using a high intensity light source modulated by an electro-optic crystal together with polarizing and analyzing optics. In this invention, the coincidence of spectral characteristics in the selected components along with a novel optical system provides an electrical signal printer with a speed exceeding those presently known.

Thus, it is an object of the present invention to define a high speed electrical signal recorder.

It is a further object of the present invention to define a novel optical system for an electrical signal recorder.

It is a further object of the present invention to define a novel combination of light source, light modulator and optical components for high speed xerography.

Further objects and features of the present invention will become apparent while reading the following description in connection with the drawings, wherein.

The basic aim of the present invention is to provide means of scanning a xerographic drum with modulated actinic radiation having a higher intensity and at least as good resolution as can be obtained with the best cathode ray tube flying spot scanner. This is achieved by light modulating means utilizing crystals displaying the Kerr electro-optic effect.

Such electro-optic crystals have been found to have very low transmission losses in the range from 4000 to 6000 angstroms, which is the actinic range for most conventional xerographic plates. As an example, cuprous chloride crystals which may constitute the electro-optic modulator in the present invention have less than 1% transmission absorption in wave lengths from 4000 angstroms to about 20,000 angstroms. The peak visible spectral response of pure vitreous selenium is about 4000 angstroms, but with the addition of telurium, the wave lengths for peak response of the selenium can be raised to in the range of 5000 angstroms.

Unfortunately, the electro-optic crystals require a nearly monochromatic light source for efficient operation. With polychromatic light some portions of the spectrum will have a different plane of polarization rotation on passing through the crystal. This means that for efficient operation of the electro-optic crystal modulator with a xerographic photoreceptor, the light source should have a nearly monochromatic output within the actinic range of the xerographic drum or else it should have a very strong output within that actinic range with filters to block other parts of the spectral output from the electro-optic crystal.

Figure 1:
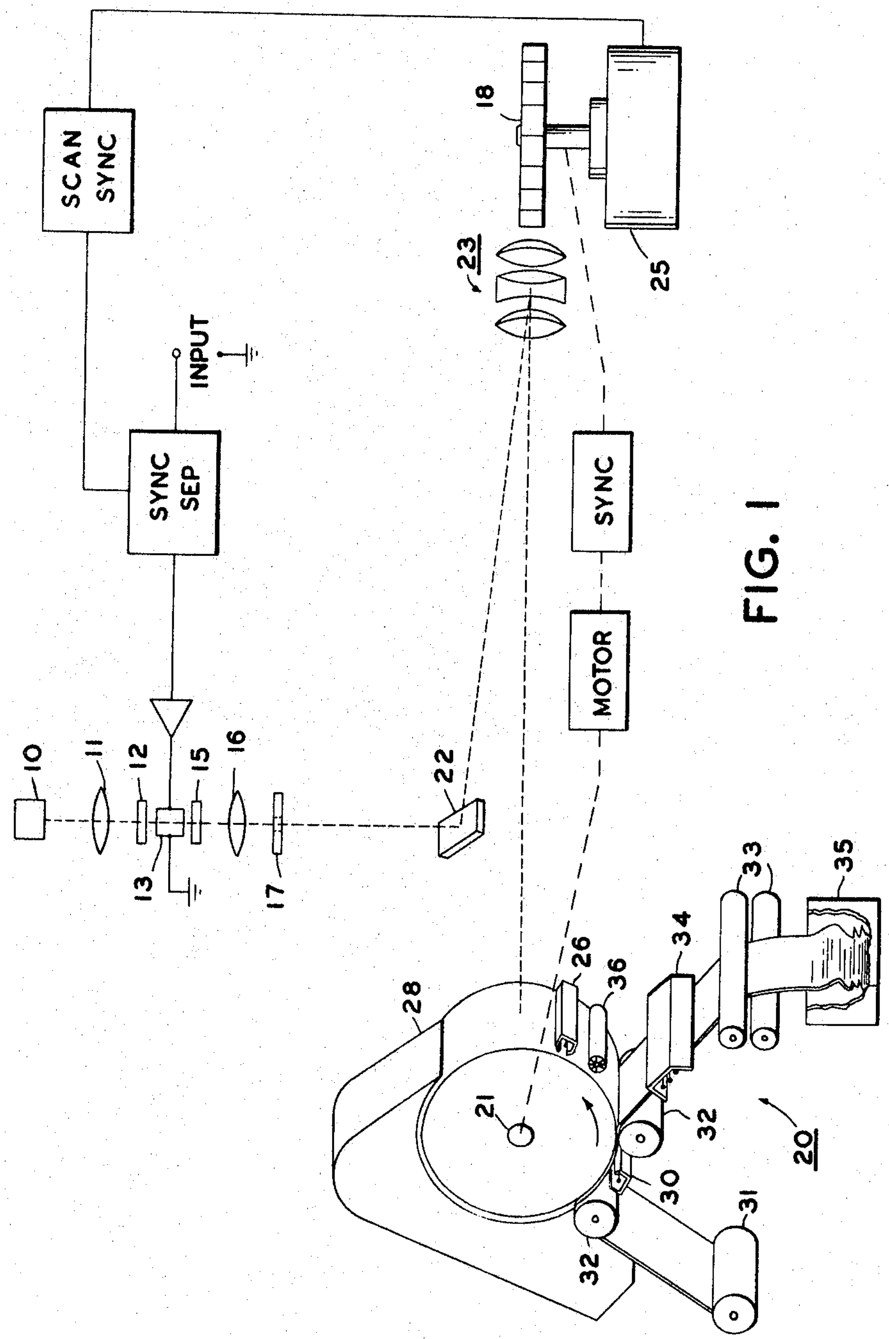
FIGURE 1 is an isometric illustration of an electrical signal recording system in accordance with the invention.

In the recording system illustrated in FIGURE 1, a light source 10 can be a monochromatic light source such as a laser. This monochromatic output provides an ideal source for operation with an electro-optic crystal and eliminates the need for filters, heat reflectors and absorbers such as are necessary with intense sources having high output in the infrared regions. A more detailed description of the optical system and electro-optic modulator is given in connection with FIGURE 2.

The optical system can be briefly described for FIGURE 1 as follows: Following the generalized light source 10 is collimator lens 11. Where light source 10 comprises a collimated beam laser, collimator lens 11 will not of course be necessary. The emergent collimated light is passed through first polarizer 12 followed by electro-optic crystal 13 and polarization analyzer 15. Converging lens 16 focuses the beam on the aperture in aperture plate 17. In the preferred embodiment, the scanning means comprising a polygonal scanning mirror 18 is positioned facing xerographic apparatus 20 with the plane of the scanning polygon aligned with a longitudinal planar section through the axis of xerographic drum 21. The light source and modulating elements are suitably arranged with an axis perpendicular to the scan axis between scanning mirror 18 and xerographic drum 21. Mirror 22 is positioned just out of the scan axis in line with the modulating elements so as to deflect the modulated light beam to objective lens assembly 23 immediately in front of the scanning mirror. This objective lens is designed so that aperture 17 is at the focal point of the lens and the optical path between lens 23 and aperture 17 is the same length as the optical path between lens 23 and the xerographic drum surface.

So that the off-axis beam of light from mirror 22 will be reflected by the scanning polygon onto the xerographic drum surface, the mirrors in the scanning polygon are slightly tilted, giving it the shape of a truncated prism. In a preferred arrangement the beam from mirror 22 enters the objective lens 4° above the scan axis. To obtain reflection from the scanning mirror in the proper scan axis, the facets of scanning polygon 18 were each tilted 2° from the vertical with their upper edges tilted inward. The scanning mirror is rotated by motor 25. It will, of course, be understood that the scanning function performed by polygonal scanning mirror 18 could be carried out by other means such as will readily occur to those skilled in the art.

Xerographic drum 21 rotates consecutively through a charging station depicted by corona discharge device 26, exposure station 27 where the beam from the polygonal scanning mirror sweeps across the surface of the drum, through developing station 28 depicted by a cascade development enclosure, transfer station 30 where a web of copy paper is passed in contact with the drum and receives an electrostatic discharge to induce a transfer of the developed image from the drum to the copy paper. Copy paper is supplied from supply reel 31, passes around guide rollers 32 and through drive rollers 33 into receiving bin 35. A fusing device 34 fixes the images to the copy paper as it passes to bin 35.

In operation using an unpolarized monochromatic light source, the light is normally extinguished by the crossed polaroids 12 and 15. On the application of an electrical signal to electro-optic crystal 13, the plane of polarization of the light waves is rotated so that a portion of the light passes through polarization analyzer 15 and continues on through aperture 17. Light passing through aperture 17 is reflected by stationary mirror 22 into objective lens 23. Light passing through objective lens 23 is reflected by polygonal scanning mirror 18 back through lens 23 so that it scans the surface of drum 21 at exposure station 27. Since this light is modulated in accordance with the signal applied to electro-optic crystal 13, it illuminates drum 21 dissipating the electrostatic charge in accordance with the electrical signal applied to crystal 13. The electrostatic charge pattern thus produced is developed in developing station 28 and then transferred to final copy paper. The xerographic drum is then cleaned by some cleaning device such as rotating brush 36 before being recharged by charging device 26.

Figure 2:
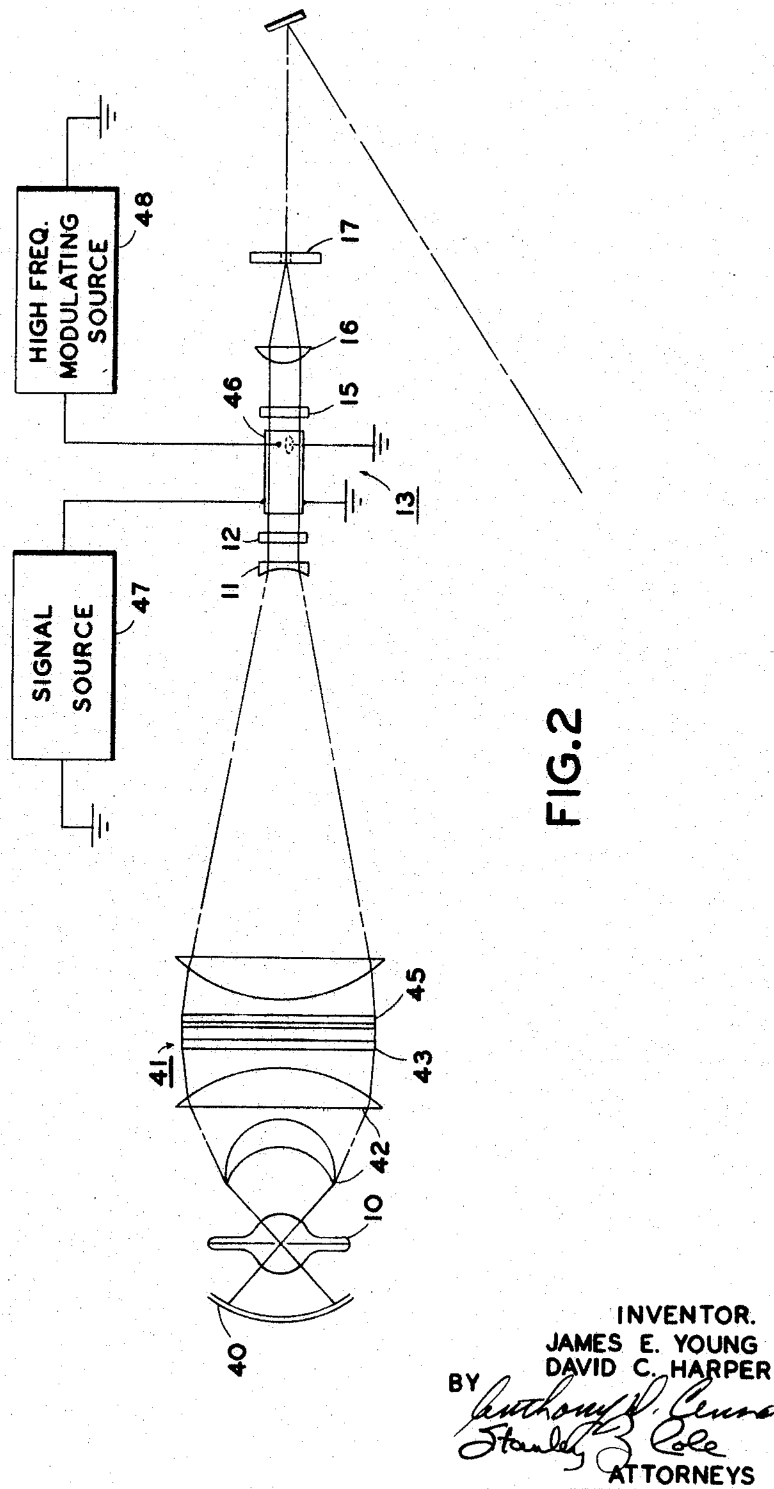
FIGURE 2 is a diagrammatic illustration of a light source modulating elements and the pertinent optics in accordance with the invention.

FIGURE 2 is a detailed embodiment of a light source with light modulating components. The same item numbers are used in this figure as are used in FIGURE 1 to designate like elements. Thus, the light source 10 in FIGURE 2 is a compact mercury arc lamp, the output of which is largely intercepted by a spherical mirror 40 positioned behind the mercury arc and a large aperture lens system 41 positioned in front of the mercury arc. This is a condensing lens system designed to capture a large amount of light from the mercury arc and then converge the light down to a small diameter beam at collimating lens 11.

Due to the intense output of the mercury arc lamp, the first two elements of lens system 41 are preferably made of heat resistant quartz coated with heat reflective coatings 42. As an additional precaution, to restrict heat radiation, a sheet of heat absorbent glass 43 can be interposed in lens system 41. This is also a suitable location for a light filter 45 to restrict the output of the mercury arc lamp to a very narrow spectrum suitable for the electro-optic light modulator.

A mercury arc lamp has strong output at 405 millimicrons and at 436 millimicrons, suitable wavelengths for a selenium plate. Thus, for use with a selenium plate, the interference filter 45 should preferably be designed to pass wavelengths between 405 and 436 millimicrons. Using a selenium telurium plate, the output lines from the mercury arc lamp at 546 and 579 millimicrons are preferable, and the interference filter 45 should be designed to pass the frequency spread between 546 and 579 millimicrons. This frequency spread in each case is still narrow enough to yield good performance from the electro-optic light modulator.

The optical elements described so far are preferably cooled by air flow. The main bulb of the mercury arc lamp has to be shielded from this air flow as it must operate at a very high temperature for purposes of efficiency. Thus, the cooling air flow is passed by reflector 40, lens system 41, the heat absorbing glass and interference filter, and also by the electrode lead-in portions of the mercury arc lamp.

Light from condensing lens system 41 is converged to collimating lens 11 which collimates the light in a beam having the diameter of the electro-optic crystal aperture.

Electro-optic crystal 13 is illustrated as a cubic crystal operated in the transverse mode. The crystal is preferably a member of class $\bar{4}3m$ in the Hermann-Manguin point group notation. Other crystal classes including 23 of the cubic system, 3, 32 and $3m$ of the trigonal system, and $\bar{6}$ and $\bar{6}m2$ of the hexagonal system, may also be utilized in the invention as all these classes exhibit a dual transverse linear electro-optic effect; however, crystals of class $\bar{4}3m$ of the cubic system have the added advantage of displaying neither natural birefringence nor complicating optical activity. Operation in the transverse mode is a preferred arrangement since the transverse mode permits use of electrodes on the sides of the crystal out of the path of light transmission.

While the angle of the light rays entering the crystal is not critical in transverse mode operation as it is in the longitudinal mode operation, the aperture for transverse mode operation is nevertheless considerably limited by the practical cross sectional size available in these crystals. Thus, crystal 13 may have a cross sectional diameter of about 0.12 inch. In order to obtain efficient operation of the light modulator with signal voltages under 500 volts, crystal 13 preferably has at least a 10 to 1 aspect ratio. Thus, with a diameter of 0.12 inch, the length is preferably about 1.2 inches. While the small crystal aperture places heavy demand on the optical system, it is not detrimental in operation since the high resolution spot reaching the photosensitive recording element is desirably about 5 mils in diameter.

Electrodes 46 are conductive coatings on at least two sides of crystal 13 for applying a transverse electrical signal field. A signal source 47 is connected to electrodes 46. This signal source may suitably be a facsimile transmitter and a voltage amplifier for increasing the peak-to-peak voltage to a level in the range of 100 to 800 volts for good modulation. Lower voltages will drop the modulation level below 10 percent unless the aspect ratio of the crystal is greatly increased. Higher voltages will function equally well and permit a decrease in the crystal aspect ratio, but only with a considerable increase in cost of the electronics.

With cubic crystals operated in the transverse mode, a second set of opposed electrodes can be placed on the sides of the crystal displaced 90 degrees from the first set. This second set of electrodes can be used to superimpose a half tone modulation on the light beam. Thus, high frequency modulating source 48 can be connected to a second set of electrodes for secondary modulation of the light beam. The frequency of source 48, if used for half tone purposes, is preferably variable to permit selection of half tone grain.

Polarizing element 12 is a dichroic crystal sheet polarizer or a nicol prism type of polarizer. Polarizing element 12 is positioned between collimating lens 11 and crystal 13. Analyzer 15 is placed at the opposite end of crystal 13 and is a polarizing element similar to eliment 12 positioned in a crossed relationship.

The polarization axis of analyzer 15 need not be displaced exactly 90 degrees from that of element 12 and is preferably adjustable to compensate for the characteristics of different signals. A considerable amount of residual light level is acceptable in most xerographic systems and variations in intensity above such a residual threshold are readily recorded. Thus, when the signal is weak, it may be desirable to cross the polarizers only by 45 degrees so that peak transmission can be obtained with a relatively small signal.

A converging lens 16 is positioned following the electro-optic modulating elements to focus the modulated light beam down to the size of the aperture in aperture plate 17. Since it is this aperture that will eventually be focused on the photosensitive recording member, the aperture size will limit the maximum resolution of the system. The aperture size is thus preferably in the range of .005 inch diameter.

In operation, the amplified video signal is applied to the electro-optic modulating cell while an intense beam of light is transmitted through the cell to the scanning system. The scanning mirror is synchronized in rotation to a synchronization signal representative of the scan rate used to obtain the original video signal. The rotation rate of the xerographic drum determines the spacing of the scan lines and it also is preferably synchronized in some manner to the signal source to maintain image linearity. The source image is reproduced in accordance with the signal and is transferred to printout paper for use or storage.

While the present invention has been described as carried out in specific embodiments thereof, there is no desire to be limited thereby, but it is intended to cover the invention broadly within the spirit and scope of the appended claims.

What is claimed is:

1. Apparatus for recording information from an electrical signal comprising:
(a) a photosensitive member adapted for movement in a given direction;
(b) a high intensity light source;
(c) a rotatable polygonal mirror positioned to reflect light from said source onto said member and by rotation adapted to scan the reflected light in successive traces across said member in a direction perpendicular to said given direction;
(d) optics for focusing said light source on said member via said mirror;
(e) means to rotate said mirror;
(f) means to move said member;
(g) a polarizing element in the path between said light source and said mirror for polarizing the light passing to said mirror;
(h) a polarization analyzer element positioned in the light path on the mirror side of said polarizing element;
(i) a transparent ferroelectric polarization-rotating crystal positioned in said light path in between said polarizing element and said analyzer element; and,
(j) electrical signal coupling means connected to said crystal for selectively rotating the plane of polarization of said light from said source so as to modulate the light passing through said analyzer element.

2. Apparatus for recording information from an electrical signal, according to claim 1 in which said crystal comprises a cubic crystal of cuprous chloride positioned between cross-polarizers and operated in the transverse mode.

3. Apparatus for recording information from an electrical signal comprising:
(a) a photosensitive surface adapted for motion in a specific direction;
(b) means for producing a plane polarized collimated light beam;
(c) a transparent electro-optic polarization plane rotating crystal positioned in the path of said light beam;
(d) means for applying an electric field across said crystal in accordance with said electrical signal;
(e) a polarization analyzer element positioned in the path of said light beam and adjacent to the side of said crystal from which said light beam emerges;
(f) means for directing said light beam upon emergence from said polarization analyzing element into successive linear traces upon said photosensitive surface, the direction of said traces being at right angles to said specific direction.

4. An apparatus according to claim 3 wherein the photosensitive surface comprises the face of a uniformly rotating cylindrical drum and wherein said means for directing said light beam upon emergence from said polarization analyzer comprises a rotating reflecting mirror upon which said light beam is made to impinge.

5. An apparatus according to claim 3 wherein said crystal is a member of class $\bar{4}3m$ of the Hermann-Manguin point group notation and wherein said crystal is positioned in the path of said light beam with the face of said crystal perpendicular to the path of said light beam.

6. Apparatus for recording information from an electrical signal comprising:
(a) a photosensitive surface formed as the face of a uniformly rotating cylindrical drum;
(b) means for producing a plane polarized collimated light beam;
(c) a transparent electro-optic crystal of class $\bar{4}3m$ in the Hermann-Manguin point group system positioned in the path of said light beam with the face of said crystal perpendicular to the path of said light beam;
(d) means for applying an electric field across said crystal in accordance with said electrical signal, comprising a pair of parallel conductive electrodes to which said signal is conducted, said electrodes being positioned on such opposing faces of said crystals as to produce in accordance with said signal an electric field transverse to the path of said light beam within the crystal;
(e) a polarization analyzer element positioned in the path of said light beam and adjacent to the face of said crystal from which said light beam emerges;
(f) means for directing said light beam upon emergence from said polarization analyzer element into successive linear traces upon said photosensitive surface, comprising a rotating reflecting mirror of plane faces upon which said light beam is made to impinge.

7. Apparatus for recording an electrical signal consisting of two independent component signals, comprising:
(a) a source of plane polarized collimated light;
(b) an electro-optic crystal of class $\bar{4}3m$ in the Hermann Manguin point group notation, positioned in the path of said light with a face of said crystal perpendicular to the path of said light;
(c) means to couple said electrical signal to said crystal consisting of two pairs of parallel conductive plane electrodes, each pair of which are electrically connected to one of said independent component signals, and elements of each pair of which are positioned parallel to the path of said light and on non-adjacent faces of said crystal;
(d) a polarization analyzer element positioned in the path of said light on the side of said electro-optic crystal opposite to said light source;
(e) a plane mirror positioned in the path of said light following said analyzer and on the side of said analyzer non-adjacent to said electro-optic crystal, said plane mirror being oriented to change by reflection the direction of propagation of said light;
(f) a rotating polygonal mirror positioned in the path of said light following said plane mirror, and oriented to reflect said light from its successive faces as it rotates; and,
(g) a uniformly rotating cylindrical drum bearing a xerographic surface, positioned with said surface intercepting the path of said light reflected from said rotating polygonal mirror, and so oriented that its axis of rotation lies in the same plane as the principal plane of said polygonal mirror.

References Cited

UNITED STATES PATENTS 3,154,371 10/1964 Johnson ------------ 178—6.7

JOHN W. CALDWELL, *Primary Examiner.*

H. W. BRITTON, *Assistant Examiner.*